US009165015B2

(12) United States Patent
Kauffman et al.

(10) Patent No.: US 9,165,015 B2
(45) Date of Patent: Oct. 20, 2015

(54) SCALABLE AND USER FRIENDLY FILE VIRTUALIZATION FOR HIERARCHICAL STORAGE

(75) Inventors: Steven V. Kauffman, San Jose, CA (US); Rainer Richter, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 12/846,819

(22) Filed: Jul. 29, 2010

(65) Prior Publication Data
US 2012/0030179 A1 Feb. 2, 2012

(51) Int. Cl.
*G06F 17/00* (2006.01)
*G06F 17/30* (2006.01)

(52) U.S. Cl.
CPC .... *G06F 17/30221* (2013.01); *G06F 17/30091* (2013.01); *G06F 17/30011* (2013.01)

(58) Field of Classification Search
CPC .................................................. G06F 17/30091
USPC ......................................... 707/673, 696, 741
See application file for complete search history.

(56) References Cited

U.S. PATENT DOCUMENTS

| 7,546,284 | B1 * | 6/2009 | Martinez et al. ....................... 1/1 |
| 2006/0190583 | A1 | 8/2006 | Whalen .......................... 709/223 |
| 2006/0282457 | A1 * | 12/2006 | Williams ....................... 707/102 |
| 2007/0282806 | A1 * | 12/2007 | Hoffman et al. ................... 707/3 |
| 2009/0070382 | A1 * | 3/2009 | Agrawal et al. ............... 707/200 |
| 2009/0182789 | A1 | 7/2009 | Sandorfi et al. ............... 707/204 |
| 2009/0187610 | A1 * | 7/2009 | Guo .............................. 707/203 |
| 2009/0228460 | A1 * | 9/2009 | Martinez et al. ................... 707/3 |
| 2010/0106734 | A1 * | 4/2010 | Calder et al. .................. 707/758 |
| 2011/0016091 | A1 * | 1/2011 | Prahlad et al. ................ 707/654 |

FOREIGN PATENT DOCUMENTS

| EP | 1 973 049 | 9/2008 | ............. G06F 17/30 |
| WO | 2006/116203 | 11/2006 | ............. G06F 17/30 |
| WO | 2009/064720 | 5/2009 | ............. G06F 17/30 |

OTHER PUBLICATIONS

Kauffman et al., U.S. Appl. No. 14/818,244, filed Aug. 4, 2015.

* cited by examiner

*Primary Examiner* — Khanh Pham
*Assistant Examiner* — Eliyah S Harper
(74) *Attorney, Agent, or Firm* — Zilka-Kotab, PC

(57) ABSTRACT

In one embodiment, a method includes storing files in at least one directory in a first storage tier on at least one random access storage medium, creating an index file which includes entries for each file stored in the directory in the first storage tier on the at least one random access storage medium, aggregating in binary large objects (BLOBs) the files stored in the directory in the first storage tier on the at least one random access storage medium, writing out the aggregated BLOBs of files to a second storage tier on at least one sequential access storage medium, adding location information for each aggregated BLOB of files written to the second storage tier on the at least one sequential access storage medium to the index file, and copying the index file to the second storage tier on the at least one sequential access storage medium.

17 Claims, 5 Drawing Sheets

SCALABLE AND USER FRIENDLY FILE VIRTUALIZATION FOR HIERARCHICAL STORAGE

BACKGROUND

A virtual tape system is a tape management system such as a special storage device or group of devices and software which manages data such that the data appears to be stored entirely on tape cartridges when portions of the data may actually be located in faster, hard disk storage. Programming for a virtual tape system is sometimes referred to as virtual tape server (VTS), although these terms may be used interchangeably, unless otherwise specifically indicated. A virtual tape system may be used with hierarchical storage management (HSM) system in which data is moved as the data falls through various usage thresholds to slower but less costly forms of storage media. A virtual tape system may also be used as part of a storage area network (SAN) where less-frequently used or archived data can be managed by a single virtual tape server for a number of networked computers.

In prior art virtual tape storage systems, such as International Business Machines (IBM) Magstar Virtual Tape Server, at least one virtual tape server (VTS) is coupled to a tape library comprising numerous tape drives and tape cartridges. The VTS is also coupled to a direct access storage device (DASD), comprised of numerous interconnected hard disk drives.

The DASD functions as a tape volume cache (TVC) of the VTS subsystem. When using a VTS, the host application writes tape data to virtual drives. The volumes written by the host system are physically stored in the tape volume cache (e.g., a RAID disk buffer) and are called virtual volumes. The storage management software within the VTS copies the virtual volumes in the TVC to the physical cartridges owned by the VTS subsystem. Once a virtual volume is copied or migrated from the TVC to tape, the virtual volume is then called a logical volume. As virtual volumes are copied from the TVC to a Magstar cartridge (tape), they are copied on the cartridge end to end, taking up only the space written by the host application. This arrangement maximizes utilization of a cartridge storage capacity.

The storage management software manages the location of the logical volumes on the physical cartridges, and the customer has no control over the location of the data. When a logical volume is copied from a physical cartridge to the TVC, the process is called recall and the volume becomes a virtual volume again. The host cannot distinguish between physical and virtual volumes, or physical and virtual drives. Thus, the host treats the virtual volumes and virtual drives as actual cartridges and drives and all host interaction with tape data in a VTS subsystem is through virtual volumes and virtual tape drives.

One issue of VTS systems is the management of data within the tapes. The VTS system may have a number of duplicate, invalid, latent or unused copies of data. After a virtual tape volume is created and/or modified (one or more records are written to the volume) and closed, the virtual tape volume is copied onto the physical tape (logical) volume. The image of the virtual volume copied to a physical volume when the virtual volume was closed is a complete version of the virtual volume at the point in time the virtual volume was closed. If a virtual volume is subsequently opened and modified, when the virtual volume is closed, that image of the virtual volume is also copied onto physical tape, however the virtual volume does not overwrite the prior version of the volume since the virtual volume may have a different size than the previous version. So at any point in time, there may be several versions of the same volume serial number that reside on one or more physical tape volumes.

Moreover, physical volumes within a VTS are arranged in groups that are called "pools," with each physical volume including one or more logical volumes. Each of the physical volumes managed by the VTS system is assigned to one of 32 pools, for example. It is understood that each pool of physical volumes is assigned a name and may have one or more parameters associated therewith. For example, typical parameters associated with a pool include, blit are not limited to: a media type (e.g. physical volumes having 10 Gbyte tape or 20 Gbyte tape); and a rule(s) for managing volumes in a pool. One rule may involve the concept of "reclamation" whereby the VTS monitors what percentage of data associated in a particular physical volume is still valid. That is, over time, data space occupied by a logical volume needs to be reclaimed from a physical volume when the data is no longer used or needed by the host, i.e., has expired. Thus, if any volume(s) in the pool falls below a reclaim percent threshold, then a reclamation process will be performed to take the valid logical volume(s) off the physical volume and put the valid logical volume on another physical volume—potentially combining multiple partially full physical volumes and tilling up the other.

If a virtual volume is removed from the physical volume and put on to another physical volume, the data on the first physical volume is deleted but has not been overwritten, and thus, the data may be recovered. Further, data associated with the most current version of a virtual volume may be expired or considered latent or unusable by the customer, but the virtual volume still will exist on the physical tape volume and could be accessed.

Hierarchical storage, with active files on a first tier of media (such as hard disk, optical disk, nonvolatile memory, etc.) and archived files on a second tier of media (such as magnetic tape, digital tape, hard disk, etc.) is popular with users for its cost savings, energy savings, etc. A common scheme is to use hard disk media for the first tier and magnetic tape media for the second tier. However, traditional HSM systems suffer from several drawbacks which limit their adoption.

A standard approach for HSM is to migrate files to the second tier and leave a stub file on the first tier. An access to the stub file causes the original file to be recalled from the second tier to the first tier. This approach is user friendly, as users are isolated from the details and complexity of the second tier storage. The stub file appears as a normal file on the first tier and supports some or all standard file operations. This implementation works for small scale solutions, but also has several drawbacks. These drawbacks include, but are not limited to: (1) each migrated file is represented by a stub file, which results in managing millions or billions of stub files, which is not practical from a space and time of access perspective; (2) as individual files are migrated, bottlenecks may develop from the number of transactions required to move or track the individual files; (3) centralized storage of the indexes which manage the stubs and original files may limit the size of the solution, since a central repository including a billion items may not be practical to implement; (4) users or the user's applications may not be aware that the files are on the second tier and may attempt to invoke access patterns which result in unexpected and/or unacceptable response times; and (5) the central repository represents a single point of failure that may cause the entire implementation to fail.

In an alternative approach, users and/or user's applications may move files to and from the second tier via dedicated interfaces. This implementation minimizes the risk of inadvertent second tier overloads, but also has drawbacks, including: (1) it puts a burden on users to conform to applications and/or application programming interfaces (APIs) specific to the dedicated interface, and for users who prefer a simple copy-based interface, this can preclude the use of a dedicated interface and a second tier as a solution; (2) files are still handled and tracked individually, though their data can be aggregated; (3) a central repository is still used, and the size of the central repository may still limit scalability; and (4) there is still a central point of failure (e.g., the central repository).

Therefore, a storage solution which mitigates or eliminates the drawbacks and problems associated with conventional implementations while providing a tiered storage solution which results in cost and energy savings would be beneficial.

SUMMARY

In one embodiment, a method includes storing files in at least one directory in a first storage tier on at least one random access storage medium, creating an index file which includes entries for each file stored in the at least one directory in the first storage tier on the at least one random access storage medium, aggregating in binary large objects (BLOBs) the files stored in the at least one directory in the first storage tier on the at least one random access storage medium, writing out the aggregated BLOBs of files to a second storage tier on at least one sequential access storage medium, adding location information for each aggregated BLOB of files written to the second storage tier on the at least one sequential access storage medium to the index file, and copying the index file to the second storage tier on the at least one sequential access storage medium.

According to one embodiment, a method for updating an index file includes generating a file list for an aggregation of tiles based on a file pattern descriptor for each file in the aggregation of files or a file name for each file in the aggregation of files, opening a session with a storage system manager, writing data from each file in the file list to a storage tier of a storage system, writing metadata and storage location information from each file in the file list to an index file, closing the index file, and closing the session with the storage system manager.

In one embodiment, a system includes a storage system having a first storage tier and a second storage tier, wherein the first storage tier includes random access storage media and the second storage tier includes sequential access storage media, a storage system manager, logic for storing files in at least one directory in the first storage tier, logic for creating an index file which includes entries for each file stored in the at least one directory in the first storage tier, logic for aggregating in binary large objects (BLOBs) the files stored in the at least one directory in the first storage tier, logic for opening a session with the storage system manager, logic for writing out the BLOBs of aggregated files stored in the at least one directory in the first storage tier to the second storage tier, logic for writing metadata and storage location information for each aggregated BLOB written to the second storage tier to the index tile, logic for closing the index file, and logic for closing the session with the storage system manager.

In another embodiment, a computer program product for managing a storage system includes a computer readable storage medium having computer readable program code embodied therewith, the computer readable program code comprising: computer readable program code configured to store files in at least one directory in a first storage tier; computer readable program code configured to create an index file which includes entries for each file stored in the at least one directory in the first storage tier; computer readable program code configured to aggregate in BLOBs the files stored in the at least one directory in the first storage tier; computer readable program code configured to open a session with a storage system manager; computer readable program code configured to write out the BLOBs of aggregated files stored in the at least one directory in the first storage tier to a second storage tier; computer readable program code configured to write metadata and storage location information for each aggregated BLOB written to the second storage tier to the index file; computer readable program code configured to close the index file and BLOB file; and computer readable program code configured to close the session with the storage system manager.

Other aspects and embodiments of the present invention will become apparent from the following detailed description, which, when taken in conjunction with the drawings, illustrate by way of example the principles of the invention.

DETAILED DESCRIPTION

Figure 1:
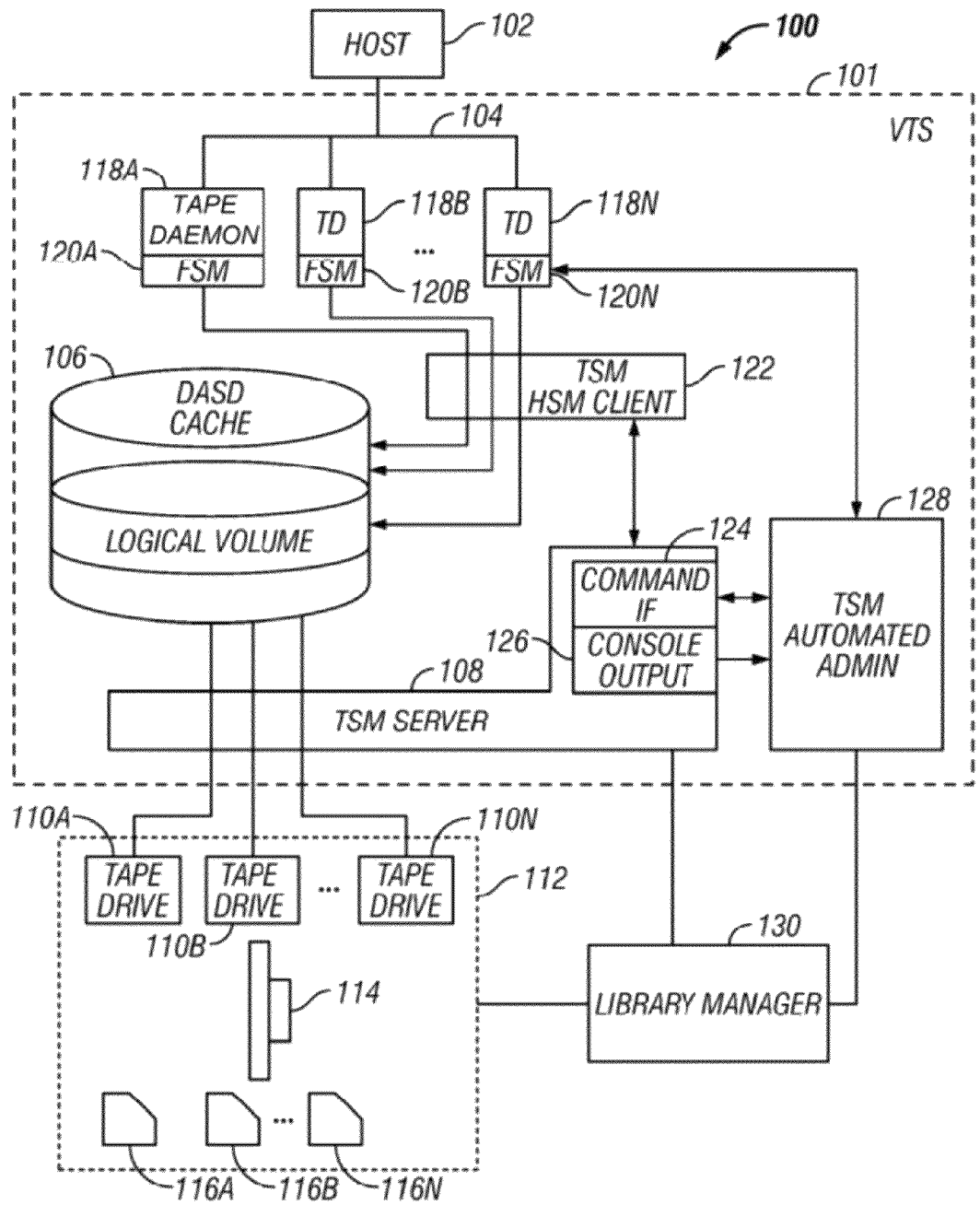
FIG. 1 illustrates a detailed block diagram of a data storage network including a data storage subsystem, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

According to one embodiment, files are migrated from a first tier (comprising, e.g., random access media, for example, hard disk media) to a second tier (comprising, e.g., sequential access media, for example, magnetic tape media). Instead of stub files being stored to the first tier, however, index files containing a plurality of entries are created. This results in an implementation which uses fewer index files, on the order of $10^3$ fewer, to maintain the location information than when stub files are used, so scalability of the solution is much better than in typical solutions.

The data in the files in the second tier, according to one approach, is processed for thousands of files at a time, and may be aggregated. This greatly reduces the number of transactions that are used in the backing second tier storage system. The backing second tier storage system, such as IBM's Tivoli Storage Manager (TSM), is aware of thousands of fewer entities. One type of second tier storage, magnetic tape in particular, is much more efficient at handling fewer, very large objects as compared to many, smaller objects. Enabling the magnetic tape to stream as compared to stopping for individual files produces dramatic performance increases.

In another embodiment, partial object recalls enable efficient access to individual file data without requiring an entire aggregate to be recalled. Also, in another approach, an interface layer enables users to execute standard file system commands known in the art such as dir/ls, copy/cp, etc., as opposed to only using specific commands accepted by a storage manager or interface layer. In this approach, the interface layer accesses the index files to satisfy the request or command.

According to another embodiment, users may view and "see" the files on the second tier in a user friendly manner, possibly as if they were resident on the first tier, but behind the scenes, the scalability and reliability of the implementation is superior to traditional hierarchical storage managers (HSMs). This implementation is especially useful for storage systems having millions or billions of files to manage.

Options on the list commands may hide or reveal the true location of the files being on the first or second tier, such as on hard disk or on magnetic tape. There is no central repository which can have size limitations, as index tiles may be distributed as needed. Also, there is no single point of failure at the interface level since index files are not centralized. This results in a situation where there may be single points of failure at the storage system level, but these failure points may be mirrored such that they cannot fail the implementation.

In one general embodiment, a method includes storing files in at least one directory in a first storage tier on at least one random access storage medium, creating an index file which includes entries for each file stored in the at least one directory in the first storage tier on the at least one random access storage medium, aggregating in Binary Large OBjects (BLOBs) the files stored in the at least one directory in the first storage tier on the at least one random access storage medium. A "BLOB" is known to those skilled in the art as an aggregation of data and/or files and a "BLOB" as used herein refers to an aggregation of files and/or data objects and/or data sets. The aggregated BLOBs of files are written out to a second storage tier on at least one sequential access storage medium, and location information is added for each aggregated BLOB of files written to the second storage tier on the at least one sequential access storage medium to the index file. The index file is copied to the second storage tier on the at least one sequential access storage medium.

In another general embodiment, a method for updating an index file includes generating a file list for an aggregation of files based on a file pattern descriptor for each file in the aggregation of files or a file name for each file in the aggregation of files, opening a session with a storage system manager, writing data from each file in the file list to a storage tier of a storage system, writing metadata and storage location information from each file in the file list to an index file, closing the index file, and closing the session with the storage system manager.

In yet another general embodiment, a system includes a storage system having a first storage tier and a second storage tier, wherein the first storage tier includes random access storage media and the second storage tier includes sequential access storage media, a storage system manager, logic for storing files in at least one directory in the first storage tier, logic for creating an index file which includes entries for each file stored in the at least one directory in the first storage tier, logic for aggregating in binary large objects (BLOBs) the files stored in the at least one directory in the first storage tier, logic for opening a session with the storage system manager, logic for writing out the BLOBs of aggregated files stored in the at least one directory in the first storage tier to the second storage tier, logic for writing metadata and storage location information for each aggregated BLOB written to the second storage tier to the index file, logic for closing the index tile, and logic for closing the session with the storage system manager.

In yet another general embodiment, a computer program product for managing a storage system includes a computer readable storage medium having computer readable program code embodied therewith, the computer readable program code comprising: computer readable program code configured to store files in at least one directory in a first storage tier; computer readable program code configured to create an index file which includes entries for each file stored in the at least one directory in the first storage tier; computer readable program code configured to aggregate in BLOBs the files stored in the at least one directory in the first storage tier; computer readable program code configured to open a session with a storage system manager; computer readable program code configured to write out the BLOBs of aggregated files stored in the at least one directory in the first storage tier to a second storage tier; computer readable program code configured to write metadata and storage location information for each aggregated BLOB written to the second storage tier to the index file; computer readable program code configured to close the index file and BLOB file; and computer readable program code configured to close the session with the storage system manager.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the tape management system is referred to herein as a Virtual Tape System (VTS), a VTS is only one example of a tape management system. As would be understood by one of ordinary skill in the art the present disclosure applies to any tape management system, such as a tape library and virtual tape software etc.

With reference now to FIG. 1, there is depicted a block diagram of an exemplary virtual storage system 100 that provides a suitable environment for the practice of the present disclosure. Virtual storage system 100 includes a virtual tape server 101, a tape library 112, and a library manager 130. A host system 102 is linked to the virtual tape server 101 via a network connection, e.g. TCP/IP, LAN, Ethernet, and the IBM Enterprise System Connection (ESCON) (not shown). In one embodiment, host system 102 is a computer, such as a personal computer, workstation or mainframe that is linked to the virtual tape server 101 via an ESCON channel. Virtual tape server 101, in one embodiment, is a computer including a processor, such as a personal computer, workstation or mainframe and is associated with a Direct Access Storage Device (DASD) cache 106. The DASD cache 106 preferably includes one or more logical volumes. In one embodiment, DASD cache 106 includes a plurality of hard disks that are spaced into redundant array of inexpensive disk (RAID) arrays.

Tape library 112 includes a plurality of tape drives 110, generally designated tape drives 110A, 110B . . . 110N, such as International Business Machine (IBM), TS1100 or Jaguar 3592 tape drives or any other tape drive known in the art. Generally, a removable storage volume, e.g., a tape cartridge 116A, 116B, . . . 116N, is loaded into each of the tape drives. Tape storage drives 110 are serviced by an accessor (e.g., a robot) 114 which transfers selected tape cartridges 116A, 116B, . . . 116N between tape storage drives 110 and their corresponding positions within a tape cartridge repository.

It will be noted that the variable identifier "N" is used in several instances in FIG. 1 to more simply designate the final element (e.g., tape drives, 110A, 110B . . . 110N, and tape cartridges, 116A, 116B, . . . 116N) of a series of related or similar elements (e.g., tape drives and tape cartridges). The repeated use of such variable identifiers is not meant to imply a correlation between the sizes of such series of elements, although such correlation may exist. The use of such variable identifiers does not require that the series of elements has the same number of elements as another series delimited by the same variable identifier. Rather, in each instance of use, the variable identified by "N" may hold the same or a different value than other instances of the same variable identifier.

Tape library 112 typically includes storage management software utilized to monitor the active space on the tape cartridges and schedule reclamations of tape cartridges when the system is less active. In one embodiment; tape library 112 is a tape library system such as the IBM Virtualization Engine TS 7740 and IBM Magstar 3494 Tape Library. Library manager 130 is utilized in virtual storage system 100 to install, maintain, configure, and operate tape library 112. Within automated library 112, accessor 114 may be controlled utilizing a library manager 130 based upon inputs received from storage management server 108 and/or an automated storage management administrator 128.

DASD cache 106 that includes, in one embodiment, a tape volume cache, provides a cache for data stored in tape library 112. DASD cache 106 maintains logical volumes as logical volume files that are concatenated into physical volume files in the tape cartridges loaded in the tape drives located within tape library 112. When a logical volume file in DASD cache 106 moves to a tape drive in a tape library 112, the logical volume file is written to a physical volume file on a tape cartridge in the actual tape drive. When a physical volume file is recalled for a tape drive and moved to DASD cache 106, the physical volume file then becomes a logical volume file in the DASD cache 106. In this way, DASD cache 106 provides a window to host system 102 of all the physical volume files in tape library 112.

Virtual tape data storage system includes a plurality of virtual tape daemons, generally designated as tape daemons 118A, 118B, . . . 118N, that represent and emulate virtual tape devices to host system 102. Host system's 102 operating system, in turn, manages the presentation of the virtual tape devices to the systems users (not shown). Host system 102 views the virtual tape devices as actual drives and when host system 102 attempts to access a logical volume in a selected virtual tape device, the respective virtual tape daemon associated with the virtual tape device requested by the host system 102 will handle the host access request.

Host-to-DASD cache data transfer in the illustrated virtual tape data storage subsystem may be controlled by VTS code via a process such as a hierarchical storage manager (HSM) client 122. For example, a HSM client 122 within virtual storage system 100 intercepts and processes the access request from the virtual tape daemons 118A, 118B, . . . 118N. HSM client 122 then carries out host system 102 request to access the logical volume file on DASD cache 106. In one embodiment, host-to-DASD cache data transfer is directly controlled by a file system manager (FSM) 120A, 120B, . . . 120N which handles DASD read and write commands.

Similarly, an interface between the DASD cache 106 and the tape storage drive 110 may be controlled by storage management server 108. For example, if HSM client 122 attempts to mount a logical volume file that is not located in DASD cache 106, HSM client 122 will communicate the access request to the storage manager server 108. If the tape in the access request is already mounted in a tape drive in tape library 112, storage manager server 108 will access the physical volume for the requested logical volume file from the mounted tape. However, if the requested file on a tape is not presently mounted in a tape drive, the storage manage server 108 will initiate a request to library manger 130 to mount the tape containing the physical volume corresponding to the requested logical volume file.

Examples of a storage management processing module which could be used as storage management server 108 and HSM client 122 are the Tivoli Storage Manager (TSM) application and IBM ADSTAR Distributed Storage Manager (ASDM) product, both of which are provided by International Business Machines Corporation of Armonk, N.Y. In data storage network 100, storage management server 108 includes a command interface 124 and a console output 126.

In a one embodiment, storage manager server 108 migrates entire logical volume files from DASD cache 106 to tape library 112. When the available space in DASD cache 106 reaches a predetermined level or after a predetermined time period, and automated storage management administrator 128 will direct storage manager server 108 to migrate logical volume files from DASD cache 106 to tape library 112 for archival therein. Typically, automated storage management administrator 128 stores information associated with the physical volumes in an associated volume status table (not shown). According to one embodiment, automated storage management administrator 128 provides functionality needed to achieve the secure data erase process of the present disclosure, and additionally performs many VTS specific administrative functions utilizing storage management server 108. For example, automated storage management administrator 128 may include a secure data erase processing module.

The requirement that the old version(s) of the VTS volume must be handled to guarantee that they cannot be recovered is met by overwriting a physical volume that contains invalidated virtual volume data within a certain time interval (i.e. grace period) specified by the customer. Thus, there is introduced a function, implemented by the VTS, and particularly, the automated storage management administrator 128 component of the VTS, for enabling data associated with a virtual or logical volume to be invalidated. A physical volume and its associated data may be secure data erased (i.e., rendered permanently unreadable by any reasonable means) by overwriting all data of the physical volume one or more times utilizing a predetermined file or data pattern (e.g., logical ones, zeroes, some combination thereof). Techniques for the secure data erase process may be user or host-selectable (e.g., based upon a desired level of security) or automatically determined. The overwriting may be performed by one of the tape drives 110A, 110B . . . 110N.

Figure 2A:
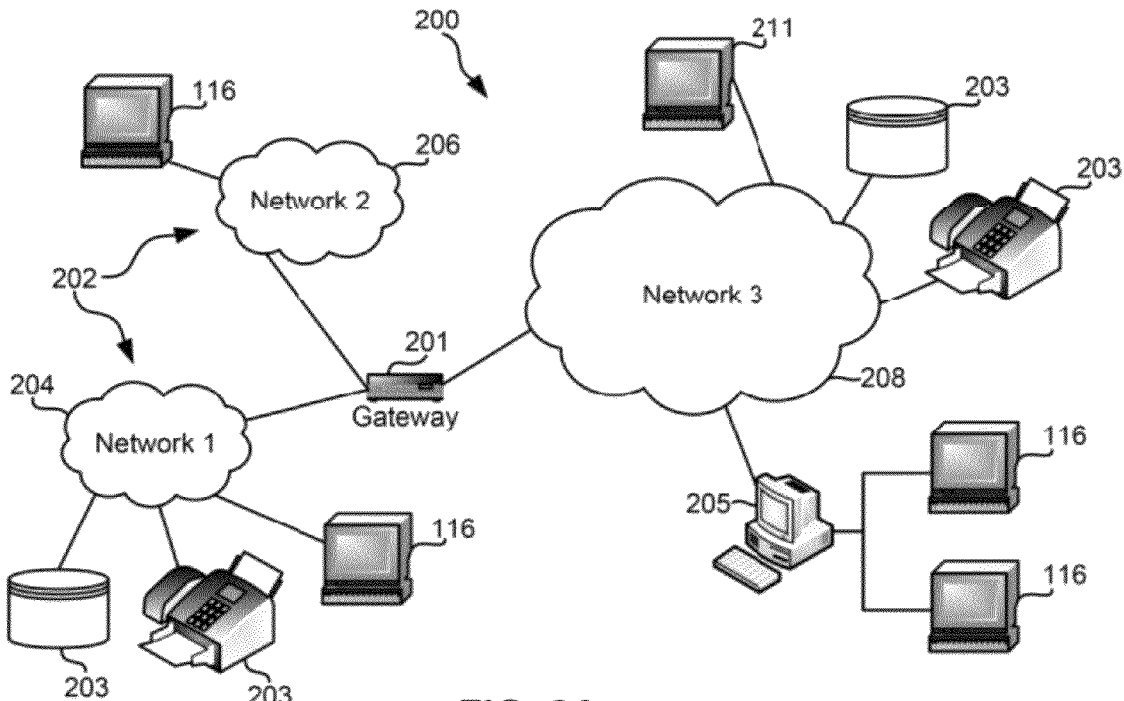
FIG. 2A illustrates a network architecture, in accordance with one embodiment.

FIG. 2A illustrates a network architecture 200, in accordance with one embodiment. As shown in FIG. 2A, a plurality of remote networks 202 are provided including a first remote network 204 and a second remote network 206. A gateway 201 may be coupled between the remote networks 202 and a proximate network 208. In the context of the present network architecture 200, the networks 204, 206 may each take any form including, but not limited to a LAN, a WAN such as the Internet, PSTN, internal telephone network, etc.

In use, the gateway 201 serves as an entrance point from the remote networks 202 to the proximate network 208. As such, the gateway 201 may function as a router, which is capable of directing a given packet of data that arrives at the gateway 201, and a switch, which furnishes the actual path in and out of the gateway 201 for a given packet.

Further included is at least one data server 205 coupled to the proximate network 208, and which is accessible from the remote networks 202 via the gateway 201. It should be noted that the data server(s) 205 may include any type of computing device/groupware. Coupled to each data server 205 is a plurality of user devices 207. Such user devices 207 may include a desktop computer, lap-top computer, hand-held computer, printer or any other type of logic. It should be noted that a user device 211 may also be directly coupled to any of the networks, in one embodiment.

A peripheral 203 or series of peripherals 203, e.g., facsimile machines, printers, networked and/or local storage units or systems, etc., may be coupled to one or more of the networks 204, 206, 208. It should be noted that databases and/or additional components may be utilized with, or integrated into, any type of network element coupled to the networks 204, 206, 208. In the context of the present description, a network element may refer to any component of a network.

Figure 2B:
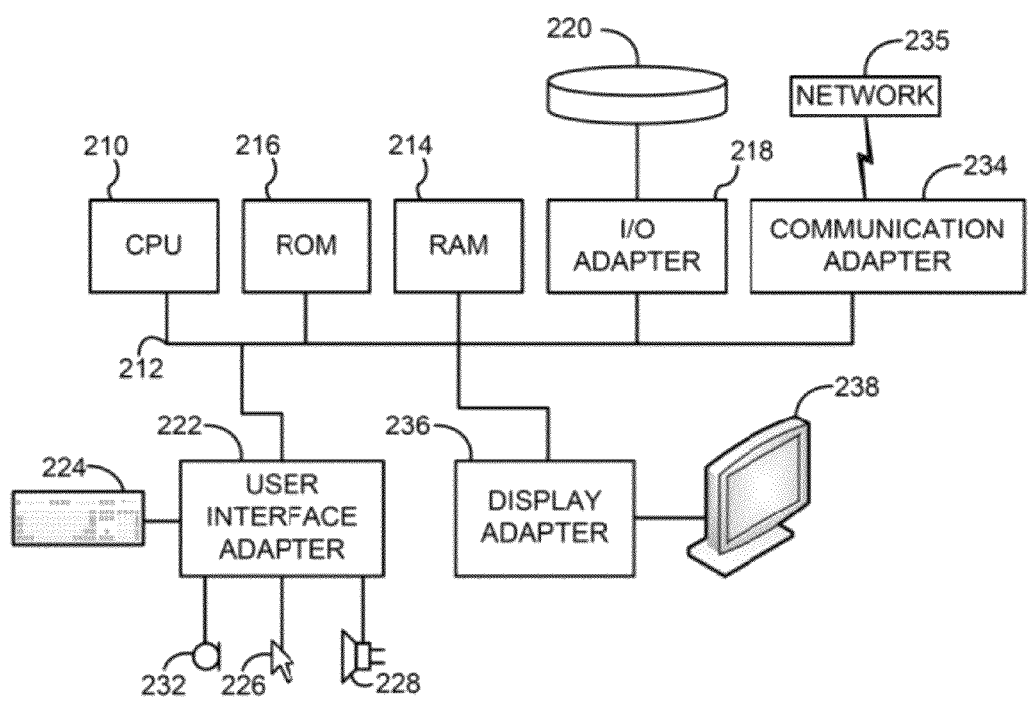
FIG. 2B shows a representative hardware environment that may be associated with the servers and/or clients of FIG. 2A, in accordance with one embodiment.

FIG. 2B shows a representative hardware environment associated with a user device 207 and/or server 205 of FIG. 2A, in accordance with one embodiment. Such figure illustrates a typical hardware configuration of a workstation having a central processing unit 210, such as a microprocessor, and a number of other units interconnected via a system bus 212.

The workstation shown in FIG. 2B includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

In one embodiment, the methods, systems, and computer program products described herein are particularly applicable to storage systems having vast amounts of image data files, such as systems for storing and managing video and picture files. A problem associated with these types of systems, when migrating data from the second tier, generally comprising sequential access media, to the first tier, generally comprising random access media, is that files stored on the second tier may appear much larger than they actually are, due to the file system being employed. This results in more data transfer than is actually necessary if the actual size of the requested data file is known prior to migration. One of the benefits of the methods, systems, and computer program products described herein is that this particular problem is eliminated and/or vastly mitigated.

According to one embodiment, there are three basic operations that may be used in managing data on a storage management system: Archive, List, and Recall. Each operation is described in order below.

Archive is an operation which causes a set of files (which are to be archived) to be defined either implicitly, via file pattern descriptors, or explicitly, via a list, in some embodiments. An application executes the following steps, according to one embodiment, in an Archive operation: (1) read the explicit list of files or process the file pattern descriptor to generate a list; (2) open a session with the storage system manager; (3) for each file in the list, write its data to the storage system tier and write the file metadata and storage location information to an index file; (4) close the storage system manager session; and (5) close the index file.

In some embodiments, index files may be written to a known location and multiple copies may be suggested. The index file may be, in one preferred embodiment, a markup language file, such as a hypertext markup language (HTML) tile, an extensible markup language (XML) file, etc. The known locations may map to subdirectory locations of the files within the index file. This facilitates List and Recall operations by greatly limiting the number of index files which are processed to those in the matching subdirectory locations only, in one approach.

List is an operation which a user invokes to submit a file pattern describing a set of tiles the user desires information about, in one embodiment. The List operation causes the interface layer to process the request and open an appropriate index file(s) in the known locations. Then, the data in the index file(s) is processed to fulfill the user's request. Next, options included with the List operation may determine whether all files or some files (such as just those files on the first tier, on the second tier, recently migrated, etc.) are reported.

Recall is an operation which a user invokes to move a subset (or all) of the files from the second tier to the first tier. The Recall operation may be used regardless of whether the subset of files were originally on the first tier prior to being stored to the second tier. In one embodiment, a List operation may identify the subset of files which satisfy the user's request, the subset may be sorted by storage location (first tier, second tier, physical location in the second tier media, etc.) so that files near each other on the second tier may be retrieved together. Storage system commands may be issued to move the data from the second tier to the first tier, or files may be moved from the second tier directly to a user's specified destination, according to various embodiments.

According to a preferred embodiment, sometimes referred to as partial file recall, an application's positional information relating to requested data may be used to correlate to a position of the actual physical location of the requested data on a sequential access storage medium, such as a magnetic tape. Also, in some approaches, a mapping table, which may be stored and updated on the first and/or second storage tiers, may be used to approximate the physical block location of the requested data based on a logical block ID provided by the application. In another approach, a superset of data, encompassing the requested data with additional data before and/or after a requested section may be recalled. This supports data formats, such as some compressed video encodings, which use prior or post information to create a valid subregion of a file.

In one embodiment, a method for accessing host data records stored in a storage system comprises receiving a mount request to access at least one host data record in a storage system, determining a starting logical block ID (SLBID) corresponding to the at least one requested host data record, determining a physical block ID (PBID) that corresponds to the SLBID, accessing a physical block on a sequential access storage medium corresponding to the PBID, and outputting at least the physical block corresponding to the PBID without outputting an entire logical volume that the physical block is stored to. In one embodiment, outputting may include copying and/or moving at least the physical block corresponding to the PBID to the first storage tier from the second storage tier.

Directories may be groups of files stored to either the first or second tier, and may have a size in a range of about 10,000 files to about 30,000 files, according to one preferred embodiment. Of course, each directory may have a different size, the same size, a size determined by some number of factors, etc., and may also have a size greater than or less than the preferred range, such as about 5,000 files, about 40,000 files, about 100,000 files, etc.

In some more embodiments, groups of data may be arbitrary, may be based on a size of the collected data, may be based on a number of files in the group, etc. Additionally, the groups of files may dynamically change in size, depending on a number of factors, according to one approach. Also, the size of the groups of data may be determined based on an optimum or statistically beneficial size in regard to the particular conditions of each individual storage management system and overall data structure in which it is implemented, in more approaches.

Figure 3:
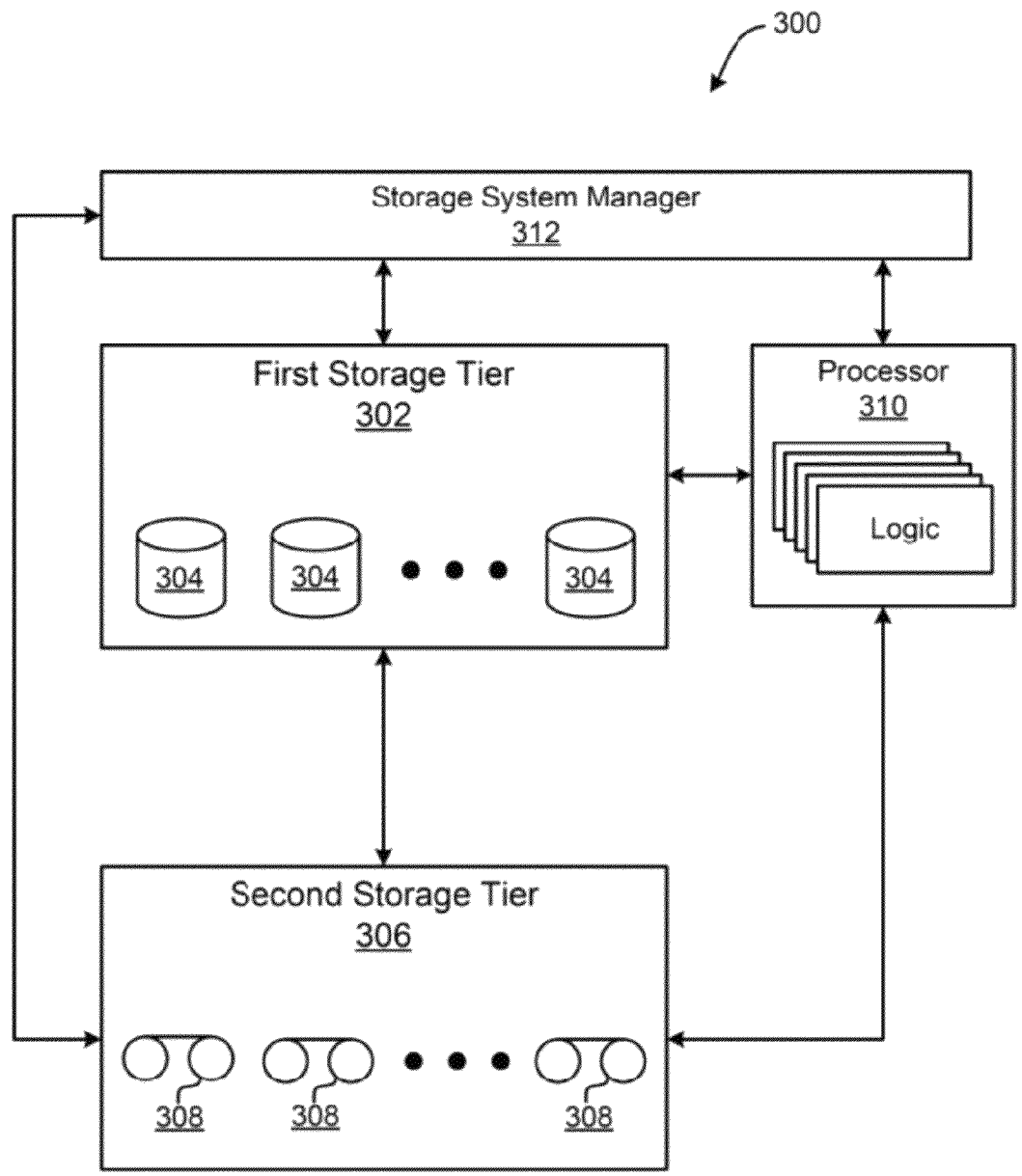
FIG. 3 is a simplified schematic of a storage system, according to one embodiment.

Referring to FIG. 3, a storage system 300 is shown, according to one embodiment. The storage system includes a first storage tier 302 and a second storage tier 306. The first storage tier 302 includes random access storage media 304, and the second storage tier 306 includes sequential access storage media 308. The storage system 300 also includes a processor 310 for executing logic therein, and a storage system manager 312. The processor 310 may be of any type known in the art, such as a central processing unit (CPU), a field programmable gate array (FPGA), an application specific integrated circuit (ASIC), etc. The logic which is described below may be implemented in hardware or software, or a combination of hardware and software, as would be known to one of skill in the art.

According to some embodiments, the storage system 300 may include logic for storing files in at least one directory in the first storage tier 302, logic for creating an index, file which includes entries for each file stored in the at least one directory in the first storage tier 302, logic for aggregating the files stored in the at least one directory in the first storage tier 302 (such aggregations are known to those skilled in the art as BLOBs), logic for opening a session with the storage system manager 312, logic for writing out the aggregated file BLOBs stored in the at least one directory in the first storage tier 302 to the second storage tier 306, logic for writing metadata and storage location information for each file aggregation BLOB written to the second storage tier 306 to the index file, logic for closing the index file, and logic for closing the session with the storage system manager 312.

In one preferred embodiment, the storage system 300 may include logic for copying the index file to the second storage tier 306. This allows for a location of the BLOBs of files to be determined without accessing another system or storage media other than the second storage tier 306 where the aggregated BLOBs of files are now stored.

In one embodiment, the random access storage media 304 may include magnetic disk media. In another embodiment, the sequential access storage media 308 may include magnetic tape media.

In one approach, the index file may be a markup language index file, such as an XML index file, an HTML index file, etc.

In another approach, the storage system 300 may include logic for determining whether to move (also known as seek to those skilled in the art) intermediate data to a new position or whether to read and discard intermediate data encountered on the sequential access storage media 308. This logic enables the system 300 to determine whether it is more efficient to perform a seek operation on the sequential access storage media 308 to jump to the position of the next desired data, or if it is more efficient to continue streaming the data from the sequential access storage media 308 and then discarding any unwanted intermediate data once it has been received.

Figure 4:
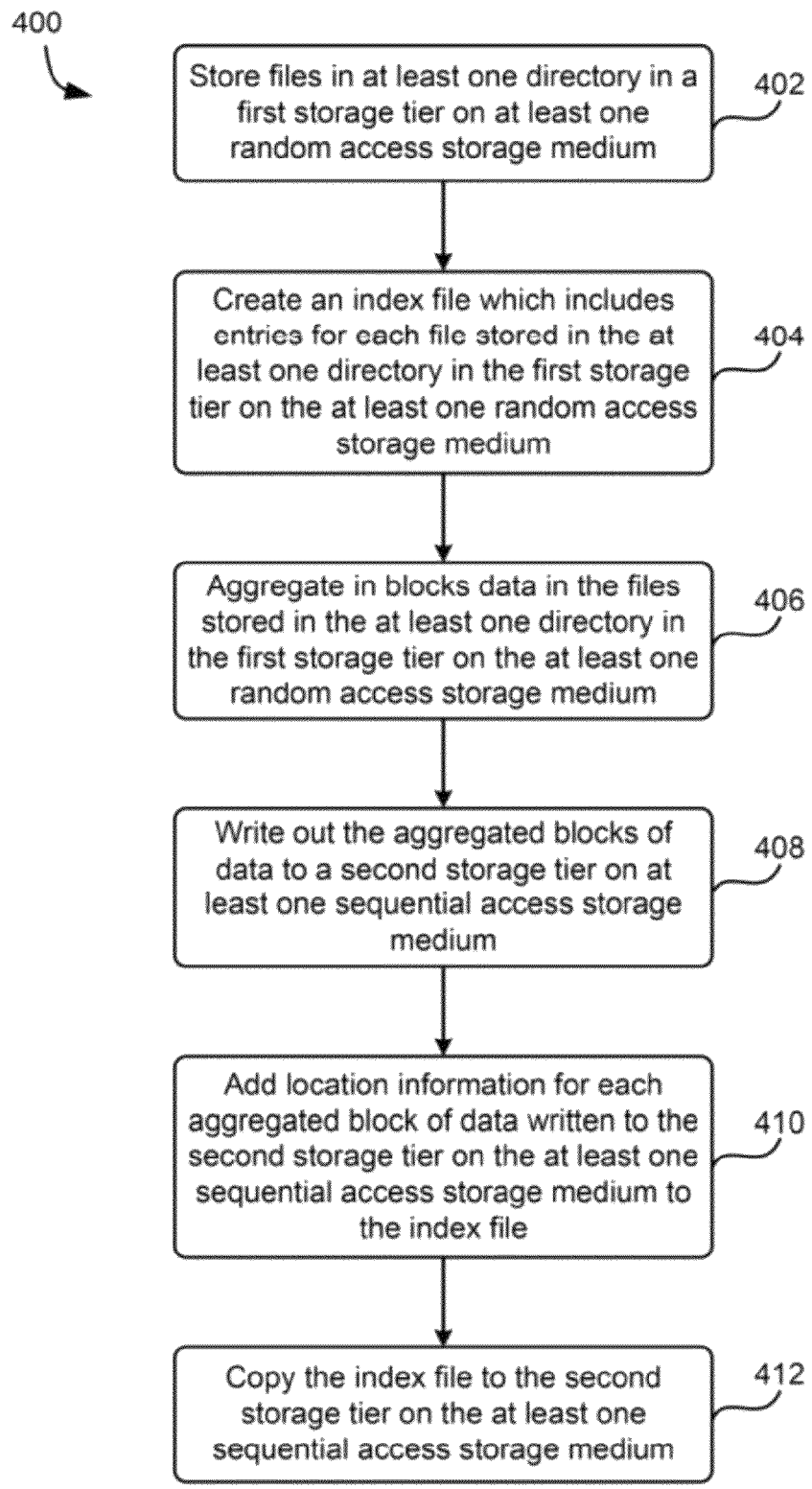
FIG. 4 is a flowchart of a method, according to one embodiment.

In one particular embodiment, as shown in FIG. 4, a method 400 for creating an index (sometimes referred to as an archive index file) is described. The method 400 may be carried out in any desired environment, and may include embodiments and/or approaches described in relation to FIGS. 1-3. Of course, more or fewer operations than those shown in FIG. 4 may be performed as would be known to one of skill in the art.

In operation 402, a group of files are stored in at least one directory in a first storage tier on at least one random access storage medium.

In a particularly preferred embodiment, at least one random access storage medium may include magnetic disk media (such as hard disk media operated by hard disk drives).

In operation 404, an index file is created including entries for each file stored in the directories in the first storage tier on the at least one random access storage medium.

In one preferred embodiment, the index file is a markup language file, such as an XML index file, an HTML index file, etc.

In operation 406, data in the files stored in the directories in the first storage tier on the at least one random access storage medium are aggregated in blocks of data known by those skilled in the art as BLOBs. The BLOBs may be of any size, such as about 5,000 tiles, about 10,000 files, about 15,000 tiles, about 40,000 files, about 50,000 files, about 100,000 files, etc. The size of the BLOB may be modified for each BLOB and/or for each system in which the method 400 is implemented.

In operation 408, the aggregated BLOBs of data are written out to a second storage tier on at least one sequential access storage medium.

In one embodiment, the second storage tier may include one or more sequential access storage media. In a particularly preferred embodiment, the sequential access storage media may include magnetic tape media.

In another embodiment, the second storage tier may include optical media, removable media, or any other media as known in the art. Note that typically the second storage tier may be comprised of a less expensive storage media (in terms of cost to store, cost to manage, etc.) than the storage media of the first storage tier.

In operation 410, location information for each aggregated BLOB of data written to the second storage tier on the at least one sequential access storage medium are added to the index file.

The location information may include a starting point, an ending point, a block size, etc., or any other information that may be useful in determining a location where the BLOB of data is located on the media of the second storage tier.

In operation 412, the index file is copied to the second storage tier on the at least one sequential access storage medium. This allows for determining a location of the files within the BLOBs of data without accessing another system or storage media other than the second storage tier where the BLOBS of data are now stored.

Figure 5:
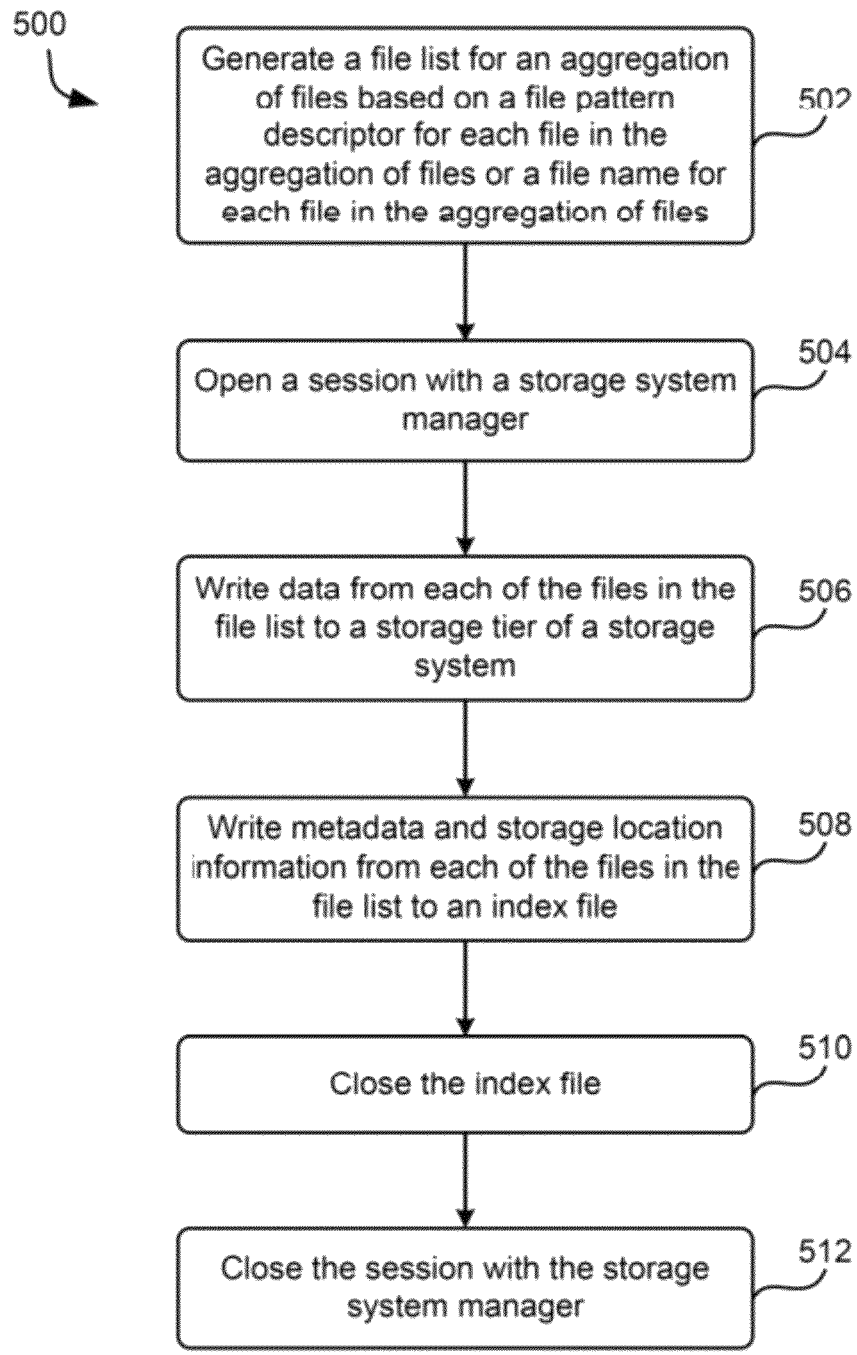
FIG. 5 is a flowchart of a method, according to one embodiment.

In another embodiment, as shown in FIG. 5, a method 500 for updating an index file is described. The method 500 may be carried out in any desired environment, and may include embodiments and/or approaches described in relation to FIGS. 1-3. Of course, more or fewer operations than those shown in FIG. 5 may be performed as would be known to one of skill in the art.

In operation 502, a file list is created for an aggregation of files based on a file pattern descriptor for each file in the aggregation of tiles or a file name for each file in the aggregation of files. The aggregation of files may be of any size, such as about 5,000 files, about 10,000 files, about 15,000 files, about 40,000 files, about 50,000 files, about 100,000 files, etc. The size of the aggregation of files may be modified for each aggregation and/or for each system in which the method 500 is implemented.

In operation 504, a session with a storage system manager is opened. This session allows for changes to be made to system storage files, including locations and contents thereof, along with any metadata and/or location information for these files.

In operation 506, data from each of the files in the file list is written to a storage tier of a storage system. The data may be written to a higher level storage tier (such as from a second tier to a first tier), may be written from a higher tier to a lower tier (such as from the first tier to the second tier), may be written to the same tier (such as from one storage medium of the first tier to another storage medium of the first tier), etc.

In operation 506, metadata and storage location information from each file in the file list is written to an index file. The index file may be specifically designed to track this type of information, or may be a more general index file which includes this information along with other pieces of data.

In operation 508, the index file is closed.

In one preferred embodiment, the index file may be copied to the storage tier of the storage system, thereby allowing subsequent accesses of the files in the file list to be made without requiring access to another storage medium other than the storage tier of the storage system where the files are stored.

In operation 510, the session with the storage system manager is closed.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
storing files in at least one directory in a first storage tier on at least one random access storage medium;
creating an index file which includes entries for each file stored in the at least one directory in the first storage tier on the at least one random access storage medium;
aggregating in binary large objects (BLOBs) the files stored in the at least one directory in the first storage tier on the at least one random access storage medium;
writing out the aggregated BLOBs of files to a second storage tier on at least one sequential access storage medium;
adding location information for each aggregated BLOB of files written to the second storage tier on the at least one sequential access storage medium to the index file;
copying the index file to the second storage tier on the at least one sequential access storage medium;
receiving a request to access at least one file stored in the second storage tier on at least one sequential access storage medium;
determining a starting logical block ID (SLBID) corresponding to the at least one requested file;
determining a physical block ID (PBID) that corresponds to the SLBID;
accessing a physical block on the sequential access storage medium corresponding to the PBID; and
outputting at least the physical block corresponding to the PBID without outputting an entire logical volume that the physical block is stored to.

2. The method as recited in claim 1, wherein the at least one random access storage medium includes magnetic disk media, wherein the at least one sequential access storage medium includes magnetic tape media, and wherein stub files are not stored to the first storage tier for the files in the at least one directory in the first storage tier that are written out to the second storage tier as the aggregated BLOBs of files.

3. The method as recited in claim 1, further comprising outputting a visual representation of the index file, wherein the representation includes a list command option to selectively reveal and/or hide a storage tier location of each file within a tiered storage system comprising the first tier and the second tier.

4. The method as recited in claim 1, wherein the index file is a markup language index file.

5. A method comprising:
generating a file list for an aggregation of files based on a file pattern descriptor for each file in the aggregation of files or a file name for each file in the aggregation of files;
opening a session with a storage system manager;
writing data from each file in the file list to a storage tier of a storage system;
writing metadata and storage location information from each file in the file list to an index file;
closing the index file; and
closing the session with the storage system manager;
receiving a request to access at least one file;
determining a starting logical block ID (SLBID) corresponding to the at least one requested file;
determining a physical block ID (PBID) that corresponds to the SLBID;
accessing a physical block on a storage medium of the storage system, the physical block corresponding to the PBID; and
outputting at least the physical block corresponding to the PBID without outputting an entire logical volume that the physical block is stored to.

6. The method as recited in claim 5, wherein the index file is a markup language file.

7. The method as recited in claim 5, further comprising:
receiving a request for information about a set of files stored to at least one storage tier of a storage system;
opening at least one index file corresponding to the set of files;
processing information in the at least one index file to retrieve the requested information;
outputting the requested information; and
closing the at least one index file.

8. A system, comprising:
a storage system having a first storage tier and a second storage tier, wherein the first storage tier includes random access storage media and the second storage tier includes sequential access storage media;
a storage system manager;
logic configured to store files in at least one directory in the first storage tier;
logic configured to create an index file which includes entries for each file stored in the at least one directory in the first storage tier;
logic configured to aggregate in binary large objects (BLOBs) the files stored in the at least one directory in the first storage tier;
logic configured to open a session with the storage system manager;
logic configured to write out the aggregated BLOBs of files stored in the at least one directory in the first storage tier to the second storage tier;
logic configured to write metadata and storage location information for each aggregated BLOB written to the second storage tier to the index file, wherein the storage location information comprises at least a physical block location correlated to a logical block identifier of each aggregated BLOB;
logic configured to close the index file;
logic configured to close the session with the storage system manager;
logic configured to receive a request for a set of files;
logic configured to locate the set of files identified in the request stored to at least one tier of the storage system using a mapping table to approximate a physical block location of the set of files based on a logical block identifier provided in the request;
logic configured to retrieve a subset of files stored to the second storage tier based on a physical proximity of the subset of files to each other on the sequential access storage media;
logic configured to determine whether to move intermediate data to a new position or whether to read and discard the intermediate data based on an efficiency of each action; and
logic configured to move the subset of files from the second storage tier to a user defined location.

9. The system as recited in claim 8, further comprising logic configured to determine a statistically beneficial size of each BLOB based on characteristics of the storage system and the storage system manager.

10. The system as recited in claim 8, wherein the sequential access storage media includes magnetic tape media, and wherein the random access storage media includes magnetic disk media.

11. The system as recited in claim 8, wherein the index file is a markup language index file.

12. The system as recited in claim 8, further comprising:
logic configured to copy the index file to the second storage tier; and
logic configured to output a visual representation of the index file, wherein the representation includes a list command option to selectively reveal and/or hide a storage tier location of each file.

13. A computer program product for managing a storage system, the computer program product comprising:
a non-transitory computer readable storage medium having computer readable program code embodied therewith, the computer readable program code comprising:
computer readable program code configured to store files in at least one directory in a first storage tier;
computer readable program code configured to create an index file which includes entries for each file stored in the at least one directory in the first storage tier;
computer readable program code configured to aggregate in BLOBs the files stored in the at least one directory in the first storage tier;
computer readable program code configured to open a session with a storage system manager;
computer readable program code configured to determine a statistically beneficial size of each BLOB based on characteristics of the storage system;
computer readable program code configured to write out the aggregated BLOBs of files stored in the at least one directory in the first storage tier to a second storage tier;
computer readable program code configured to write metadata and storage location information for each aggregated BLOB written to the second storage tier to the index file;
computer readable program code configured to close the index file and BLOB file;
computer readable program code configured to close the session with the storage system manager;
computer readable program code configured to receive a request for a set of files;
computer readable program code configured to locate the set of files identified in the request stored to at least one tier of the storage system;
computer readable program code configured to retrieve a subset of files stored to the second storage tier based on a physical proximity of the subset of files to each other on a sequential access storage media; and
computer readable program code configured to move the subset of files from the second storage tier to a user defined location.

14. The computer program product as recited in claim 13, wherein the index file is a markup language file.

15. The computer program product as recited in claim 13, further comprising:
computer readable program code configured to receive a request for information about a set of files stored to at least one storage tier of a storage system;
computer readable program code configured to open at least one index file corresponding to the set of files;
computer readable program code configured to process information in the at least one index file to retrieve the requested information;
computer readable program code configured to output the requested information; and
computer readable program code configured to close the at least one index file.

16. The computer program product as recited in claim 13, further comprising:
computer readable program code configured to copy the index file to the second storage tier; and
computer readable program code configured to output a visual representation of the index file, wherein the representation includes a list command option to selectively reveal and/or hide a storage tier location of each file.

17. The method as recited in claim 1, wherein the at least one random access storage medium is magnetic disk media, wherein the at least one sequential access storage medium is magnetic tape media, wherein the location information comprises at least two of: a starting point for each aggregated BLOB of files written to the second storage tier, an ending point for each aggregated BLOB of files written to the second storage tier, and a block size of each aggregated BLOB of files written to the second storage tier, and wherein a location of the index file on the second storage tier maps to subdirectory locations of the files referenced by the index file.

* * * * *